United States Patent [19]

Loskot et al.

[11] Patent Number: 4,565,682
[45] Date of Patent: Jan. 21, 1986

[54] PROCESS FOR PRODUCING PYROGENIC SILICIC ACID WITH INCREASED THICKENING EFFECT

[75] Inventors: Stephen Loskot, Kempten; Günter Kratel, Durach; Wilfried Lang; Ernst Mühlhofer, both of Sulzberg, all of Fed. Rep. of Germany

[73] Assignee: Wacker-Chemie GmbH, Munich, Fed. Rep. of Germany

[21] Appl. No.: 698,737

[22] Filed: Feb. 5, 1985

Related U.S. Application Data

[63] Continuation of Ser. No. 498,955, May 29, 1983, abandoned.

[30] Foreign Application Priority Data

Jun. 23, 1982 [DE] Fed. Rep. of Germany ....... 3223454

[51] Int. Cl.$^4$ .............................................. C01B 33/12
[52] U.S. Cl. .................................... 423/336; 423/337
[58] Field of Search ................................ 423/336, 337

[56] References Cited

U.S. PATENT DOCUMENTS

| | | | |
|---|---|---|---|
| 2,823,982 | 2/1958 | Saladin et al. | 423/337 |
| 3,954,945 | 5/1976 | Lange et al. | 423/336 |
| 4,292,290 | 9/1981 | Tunison | 423/336 |

Primary Examiner—Jack Cooper
Attorney, Agent, or Firm—Collard, Roe & Galgano

[57] ABSTRACT

A process for the production of pyrogenic silicic acid having an increased thickening effect which comprises subjecting silicon-containing materials to a pyrolysis flame while introducing additional energy into the flame. The invention also relates to the product so obtained, particularly useful for articles of dental care.

3 Claims, No Drawings

PROCESS FOR PRODUCING PYROGENIC SILICIC ACID WITH INCREASED THICKENING EFFECT

This application is a continuation of application Ser. No. 498,955, filed May 29, 1983, now abandoned.

The present invention relates to the production of pyrogenic silicic acid with an increased thickening effect. The invention also relates to a process for adjusting the rate of the thickening effect of the above mentioned silicic acid.

There are some processes known for producing silicic acid with an increased thickening effect. For example, according to DE-OS No. 23 37 495 a plasma burner of silicon dioxide is used for producing silicon monoxide as an intermediate product, which is re-oxidized in the presence of steam and amine, resulting in a silicic acid having a remarkably increased thickening effect.

Moreover, after-treatments are known for pyrogenic silicic acid, which likewise result in an increase of the thickening effect. With reference to these methods, DE-OS No. 26 09 487 is mentioned as an example, wherein pyrogenic silicic acid is after-treated with silicon tetrachloride and subsequently de-acidified.

It has now been found that an increased thickening effect of pyrogenic silicic acid can be obtained by introducing added energy to the pyrolysis flame.

The invention relates to a process of this type—namely, a process wherein added energy is introduced into the pyrolysis flame during the production of pyrogenic silicic acid. Preferably, the energy is added by means of one or several additional burners which introduce the energy in the form of gas flames. Any of the known gases may be used for this purpose, which are being used in the pyrogenic production of silicic acid, for instance, methane, ethane, propane, hydrogen, water gas, illuminating gas, methanol, and others.

Other examples for the introduction of added energy are, inter alia, among radiation methods, expecially radiation with laser beams.

The additional energy according to the invention is introduced preferably in amounts of 20 to 150% calculated on the energy content of the pyrolysis flame. The energy content of the pyrolysis flame results from the sum of the reaction enthalpies of the reactants.

The introduction of the energy occurs preferably in the range between ¼ to ¾ of the length over which the pyrolysis flame extends, measured at every instance from the burner opening. A preferred mode of introduction of the additional energy is within the apex of the inner cone of the pyrolysis flame.

The introduction of energy can take place at one place or at several places. The burners used may, e.g., be ring-shaped.

The flames emerging may be directed vertically onto the longitudinal axis of the pyrolysis flame, but frequently an angle of 30° to 70° with respect to the direction of the streaming gas is maintained. The introduction of energy by other methods, e.g., radiation methods, takes place in an analogous manner.

It should be understood that there is a clear distinction between the input of energy, e.g., heating gas, directly at the burner opening or in front thereof, even when an excess is present relating to the energy demand of the pyrolytic process, and the introduction, according to the invention, of additional energy into the pyrolysis flame or the product stream forming the flame, respectively.

By the use of the process according to the invention, the thickening effect of the so produced silicic acid is increased. By "adjustment of the thickening effect"—in the context of the invention, an increase of the thickening effect in a definite, desired degree, has to be understood. Principally, when the same arrangement is used, the thickening effect of the silicic acid is increased in accordance with the added energy. However, surprisingly, the demand in added energy for achieving a desired thickening effect of the silicic acid drops as the pyrolysis flame becomes larger—namely, in such a manner that at a high throughput, calculated on the energy content of the pyrolysis flame, less added energy is required percentagewise. Furthermore, the highest thickening effect, always when calculated for the same arrangement and for the same amount of added energy, is achieved, when the added energy is introduced at the apex of the inner cone of the pyrolysis flame. When the introduction of added energy is brought about in further distance from the burner opening, the thickening effect gradually drops. The thickening effect likewise drops, always calculated from the range of the apex of the inner flame cone, when the energy addition occurs close to the burner opening. When the introduction of added energy occurs directly at the burner opening, the effect according to the invention is no longer achievable.

The adjustment of the thickening effect is thus brought about by:
(a) the amount of added energy introduced, and
(b) the selection of the place of introduction within the pyrolysis flame.

Basically, the process according to the invention can be used in connection with the hitherto known processes for producing pyrogenic silicic acid, as an added means for increasing and adjustment of the thickening effect of the so produced silicic acid. For instance, the method described in DE-OS No. 26 20 737 can be applied without the invention being limited thereto.

As starting materials, the silicon compounds hitherto used for the production of pyrogenic silicic acids are used. Examples are: silicon tetrachloride, silicon tetrafluoride, organosilanes, e.g. tetramethylsilane, trimethylchlorosilane, dimethyldichlorosilane, methyltrichlorosilane, particularly however, silicon tetrachloride.

Furthermore, other gases, which burn with the formation of water, may be used, e.g. hydrogen, water gas, illuminating gas, methane, propane, and the like. As a rule, such an amount of gas which burns with the formation of water is introduced, that the reaction flame reaches a temperature of 800°–1450° C., preferably 1000°–1300° C. and that hydrolysis of every one of the Si—Cl bonds can occur.

As gases promoting the combustion, oxygen-containing gases, e.g. oxygen in pure form, oxygen in mixtures containing at least 15 vol.% oxygen, may be used, if desired, with nitrogen or other inert gases being admixed therewith. Most of the time, air is used for maintaining the combustion.

As mentioned above, the process of the invention results in the production of silicic acid with an increased thickening effect. The increase in the thickening effect refers to the effect of pyrogenic silicic acid made without the addition of energy according to the invention, under an otherwise analogous procedure. It is also possible—as likewise mentioned above, to adjust the thickening effect to the desired degree.

The silicic acid produced according to the invention is useful as a thickening agent, in general. It is particularly effective as a thickening agent for liquid media, such as alcohols, PVC-plastisols, organosols (masses for protection of substrates) and for polyesters. Furthermore, the silicic acids made according to the invention may be used as additives for toothpastes or other items used for dental care.

The invention will be more fully discussed in the following examples, which are, however, only given by way of illustration and not of limitation.

COMPARISON EXAMPLE 1

22 kg/h $SiCl_4$ are mixed with 20 $Nm^3/h$ of hydrogen and 90 $Nm^3/h$ of air, introduced by way of a cone-shaped opening into a combustion chamber and converted into silicic acid. In addition, an air current of 8 $Nm^3/h$ is directed toward the burner opening. The pyrolysis flame is about 3 m in length and is burning in an air-cooled reaction chamber. The silicic acid has a BET surface area of 200 $m^2/g$.

The thickening effect of the silicic acid is found by the increase in viscosity, obtained when 3% by weight of silicic acid is added to a 65% by weight of polyphthalic acid glycol ester solution in styrene. The measurement is carried out in a rotation viscosimeter RV3 made by the firm Haake of F.R. Germany, Karlsruhe.

The viscosity of the polyester solution is 1300 mPa.s at 20° C. and 12.5 rpm. Considering the mentioned basic viscosity and using the indicated measurement conditions, the relative viscosity found after addition of 3% by weight of silicic acid is 4000 mPa.s.

EXAMPLE 1

The method of operation as in Comparison Example 1 is repeated with the difference, that propane gas in the amount of 1.5 $Nm^3/h$ is introduced into the pyrolysis flame at an angle of 45° with respect to the flame direction by each of two (2) burners, delivering the gas at 1 meter distance from the burner opening and at 1.20 meters from the burner opening, respectively. The thickening effect is measured as above described. The viscosity found is 8000 mPa.s at 20° C. and 12.5 pm.

COMPARISON EXAMPLE 2

The method of operation as in Comparison Example 1 is repeated, with the essential difference that much higher amounts of materials are used:

200 kg/h $SiCl_4$ in the presence of 14 $Nm^3/h$ of propane. 120 $Nm^3/h$ hydrogen in mixture with 30 $Nm^3/h$ $CO_2$ and 486 $Nm^3/h$ of air are converted into silicic acid.

A 3% by weight suspension of this silicic acid in a solution of phenolphthalicacidglycol ester (measured in the manner of Comparison Example 1) has a relative viscosity of 3100 mPa.s.

EXAMPLE 2

The method of Comparison Example 2 is repeated with the change that over 4 additional burners each 1.3 $Nm^3/h$ are introduced into the pyrolysis flame as additional energy. The four (4) burners are arranged in pairs at a distance from the burner opening of 1.20 m and 1.50 m, respectively, two burners of each pair being in accurately opposite position and both pairs being displaced with respect to each other by an angle of 90°.

The silicic acid obtained, as 3% by weight suspension in polyester solution (measured in the manner of Comparison Example 2), has a relative viscosity of 6200 mPa.s at 20° C. and 12.5 rpm.

While only several examples have been described, it is obvious that many changes and modifications may be made thereunto without departing from the spirit and scope of the invention.

What is claimed is:

1. A process for producing pyrogenic silicic acid having an increased thickening effect, comprising the steps of:
    subjecting silicon-containing materials selected from the group consisting of silicon tetrachloride, silicon tetrafluoride, tetramethylsilane, trimethylchlorosilane, dimethyldichlorosilane, and methyltrichlorosilane to a pyrolysis flame, while introducing additional energy in amounts of 20 to 150%, calculated on the energy content of the pyrolysis flame, into the pyrolysis flame in an area between one-fourth and three-fourths of the longitudinal extension of the pyrolysis flame.

2. The process of claim 1, wherein the additional energy is introduced in the form of a gas flame produced from a gas selected from the group consisting of methane, ethane, propane, hydrogen, water gas, illuminating gas, and methanol.

3. The process according to claim 1, wherein the additional energy is added by use of a laser beam.

* * * * *